United States Patent
Evans et al.

(10) Patent No.: US 6,623,549 B1
(45) Date of Patent: Sep. 23, 2003

(54) DYE WAFER RETENTION IN A DESICCANT CONTAINER

(75) Inventors: John M. Evans, Piqua, OH (US); Glenn D. Perrine, Eaton, OH (US)

(73) Assignee: Stanhope Products Company, Brookville, OH (US)

( * ) Notice: Subject to any disclaimer, the term of this patent is extended or adjusted under 35 U.S.C. 154(b) by 0 days.

(21) Appl. No.: 10/110,071

(22) PCT Filed: Aug. 16, 2000

(86) PCT No.: PCT/US00/40655
§ 371 (c)(1),
(2), (4) Date: Apr. 4, 2002

(87) PCT Pub. No.: WO01/26782
PCT Pub. Date: Apr. 19, 2001

Related U.S. Application Data

(60) Provisional application No. 60/158,646, filed on Oct. 8, 1999, and provisional application No. 60/158,645, filed on Oct. 8, 1999.

(51) Int. Cl.$^7$ ........................... B01D 53/04; B01D 53/26
(52) U.S. Cl. ........................... 96/117.5; 96/135; 96/147; 96/152; 55/DIG. 5
(58) Field of Search .................. 95/117–126; 96/117.5, 96/135–138, 142, 147, 149, 151, 153, 154; 55/DIG. 5; 210/266, 282

(56) References Cited

U.S. PATENT DOCUMENTS

| | | |
|---|---|---|
| 3,171,726 A | 3/1965 | Roney et al. |
| 3,799,352 A | 3/1974 | McClive |
| 3,841,484 A | 10/1974 | Domnick |
| 3,879,292 A | 4/1975 | McClive |
| 4,436,623 A | 3/1984 | Cullen et al. |
| 5,522,204 A | 6/1996 | Wood |
| 5,529,203 A | 6/1996 | Flaugher |
| 5,569,316 A | 10/1996 | Flaugher et al. |
| 5,580,451 A | 12/1996 | Tack |
| 5,650,563 A * | 7/1997 | Cooper et al. ............... 73/40.7 |
| 5,716,432 A | 2/1998 | Perrine |
| 5,718,743 A | 2/1998 | Donnelly et al. |
| 5,910,165 A | 6/1999 | Haramoto et al. |
| 5,911,879 A | 6/1999 | Eybergen |
| 6,106,596 A * | 8/2000 | Haramoto et al. ............ 96/135 |
| 6,217,639 B1 * | 4/2001 | Jackson ....................... 96/134 |
| 6,309,450 B1 * | 10/2001 | Millen et al. ................. 96/131 |

* cited by examiner

Primary Examiner—Robert H. Spitzer
(74) Attorney, Agent, or Firm—Wegman, Hessler & Vanderburg

(57) ABSTRACT

A desiccant containing cartridge (10) has a cap (12) and a generally cylindrically cross-sectioned cup (14) for holding desiccant particles (16) and a dye wafer (18). The cup (14) includes spaced inner and outer wall portions (20, 24) connected by a transverse portion (28) to define a chamber (30) having an opening (32) for the placement of a dye wafer (18) and desiccant particles (16). The cap (12) has a planar portion (52) having outer circumference (53) and inner circumference (54) defining aperture (55) for receiving inner wall portion (20) of the cup (14) and being designed for receipt in chamber (30) to cover opening (32). Cap (12) further includes a peripheral flanged portion (56) extending transversely from planar portion (52), and having tabs (100) with an edge portion (102) which permit cap (12) to cooperate with outer wall portion (24) so that cap (12) can be retained within chamber (30) in one of a number of axially spaced positions to prevent shifting of dye wafer (18) and desiccant (16), thereby leaving a substantial portion of desiccant (16) uncontaminated and useful for LOI testing.

47 Claims, 11 Drawing Sheets

DYE WAFER RETENTION IN A DESICCANT CONTAINER

CROSS-REFERENCE TO RELATED APPLICATION

Priority filing benefit of International PCT application PCT/US00/40655 filed Aug. 16, 2000, and published under PCT 21(2) in the English language; U.S. Provisional Application Serial No. 60/158,646 filed Oct. 8, 1999; and U.S. Provisional Application Serial No. 60/158,645 filed Oct. 8, 1999.

BACKGROUND OF THE INVENTION

This invention relates to desiccant cartridges for use in air or fluid dryers of automotive air conditioning systems.

Desiccants are commonly used in automotive air conditioning systems for dehydrating air and refrigerants. Desiccant particles are common in such systems because the high surface area-to-volume ratios of the particles facilitates their interaction with surrounding air or fluid. Since the desiccant particles must be held in the air or fluid stream and prevented from contaminating other parts of the system, the particles must be held in a container which is permeable to the air or fluid but impermeable to the particles.

One form of dryer used in automotive air conditioning systems includes an elongated receiver or accumulator canister having inlet and outlet ports communicating with the interior of the canister. A desiccant container is positioned in the interior of the canister and allows for air and/or fluid through the desiccant material.

One form of package-type desiccant container for use in an accumulator or receiver dryer is constructed from synthetic felted wool or polyester which is filled with desiccant and then sealed by stitching or fusing. One drawback to this form of package is that the felted bag may not conform to the shape of the canister, so that air or fluid may bypass the desiccant. Another drawback is that the bag may be non-uniform in shape, thereby making automatic assembly of the dryer difficult.

If felted polyester is used as a less expensive substitute for felted wool, the seams of the bag may be formed by ultrasonic welding. Unfortunately, the reliability of such ultrasonic welds is questionable and the bag may open up, allowing adsorbent material to escape from the bag and potentially contaminate the system. In addition, the felted polyester bag is vulnerable to burn-through when the dryer is welded shut.

In another proposed form of an accumulator or receiver dryer, desiccant particles are trapped between a pair of grids or plates which are welded or press fit inside the canister. According to one embodiment, the desiccant is charged by pouring the desiccant particles into the canister once a first of the grids or plates is positioned. A pipe extends through holes in the grids or plates to exhaust dried air to an outlet port.

A dryer of this form is likely to be difficult to assemble because the grids or plates must be slid into position and, in some cases, welded inside the canister. Further, since the desiccant particles are manually poured into the container, the desiccant must be pre-measured due to the difficulty of controlling the amount of desiccant poured into the canister based on visual observation alone. The pouring of the desiccant creates a risk of accidental contamination outside the accumulator since desiccant particles may fall into the pipe communicating with the outlet port. Nevertheless, the amount of desiccant poured into the canister may vary from canister to canister for at least the reasons mentioned above.

U.S. Pat. No. 5,522,204, the contents of which are hereby incorporated by reference, discloses a desiccant cartridge which can be inserted within an accumulator or receiver dryer. The desiccant cartridge includes a cup for holding particulate desiccant and a cap which is locked to the cup by an integral detent on an inner wall portion of the cup.

U.S. Pat. No. 5,529,203, the contents of which are hereby incorporated by reference, also discloses a desiccant cartridge which can be inserted within an accumulator or receiver dryer. The desiccant cartridge includes a cup for holding particulate desiccant and a cap. The cap is designed for receipt in the chamber to cover the opening. In addition, the cap has a hole for receiving the inner wall portion of the cup. The cup includes a number of nib segments which are arranged into axially spaced nib groupings. The cap includes an edge portion which permits the cap to be retained between axially adjacent nib groupings thus retaining the cap within the cup in one of a number of axially spaced positions.

The desiccant particles are either poured directly into the cup, or into a felted bag which in turn is inserted into the cup before the desiccant cartridge is inserted within the receiver dryer. It is important that desiccant not shift once the cap is locked into place. If there is not enough desiccant to fill the predetermined volume, or if the desiccant should settle over time, then the desiccant within the container will undesirably shift within the chamber.

It has become increasingly popular and effective to place leak detection dyes in desiccant packages so that leaks in the air conditioning system can be readily identified. These dyes can be adsorbed into a host wafer of a substrate material, take the form of a powder or as a solid pellet, and such and are placed directly into the desiccant package during assembly. During operation of the air conditioning system, the dye mixes and circulates with the refrigerant which will be carried outside if there is a leak. These dyes illuminate under long wave ultra-violet light, as such, the leak in an air conditioning system can be located when long wave ultra-violet light is used. One popular leak detection dye is a fluorescent alkyl substituted perylene dye that dissolves in the refrigerant and flows through the refrigeration system as disclosed in U.S. Pat. No. 5,650,563. The contents of which are hereby incorporated by reference herein.

In these desiccant packages, when dye impregnated wafers, pellets, or the like, are inserted to provide for the desired leak detection requirements, the dye can migrate throughout the package contaminating almost all of the desiccant particles.

This dye migration does not normally interfere with the proper functioning of the desiccant. However, auto and truck manufacturers often perform loss on ignition (LOI) tests on the desiccant to assess the amount of moisture retention therein. This moisture amount is determined by the weight difference obtained before and after drying a desiccant sample at a specified temperature and for a specified period of time to achieve a constant weight. The difference in weight, calculated as a percentage of the sample's initial weight, after being dried, is reported as LOI.

The problem is that when the dye migrates throughout a package or container, contaminating a substantial quantity of the desiccant particles, virtually no particles or an insufficient number of same are left so that accurate LOI testing can be conducted thereon. As such, dye from a dye wafer that has contaminated the desiccant particles results in false LOI readings since the analytical equipment utilized will regard the dye as being water.

Accordingly, there is a need in the art to provide a desiccant cartridge which is simple to assemble with means for retaining a cap such that the cartridge can house both desiccant particles and a leak detection dye wafer, or the like, wherein the cap prevents the dye wafer from shifting and contaminating an excessive quantity of the desiccant particles.

SUMMARY OF THE INVENTION

These drawbacks and others are overcome by means of the present invention embodied in a desiccant containing cartridge.

The desiccant cartridge includes a cup extending along an axis and having spaced inner and outer wall portions connected by a transverse portion to define a chamber having an opening for the placement of a dye wafer and desiccant particles, and a cap for receipt in the chamber. The cap has a planar portion having an outer circumference and an inner circumference defining an aperture for receiving the inner wall portion of the container when the cap is received in the chamber.

Both the transverse portion and the cap are perforated to allow air or fluid to reach the desiccant housed thereon. The outer wall portion of the cup also may include a plurality of outer wall protrusions including, but not limited to, ribs, nibs, beads, bumps or other equivalent protrusions projecting radially inwardly from the outer wall portion which engage and retain the cap in one of a number of axially spaced positions to prevent shifting of the particulate desiccant and the dye wafer within the chamber. The inner wall portion also may include a plurality of inner wall protrusions to help retain the cap. Preferably, the inner and outer wall protrusions are arranged in axially-spaced circumferential groupings.

By reason of the ability of the cap to be adjusted to a position that prevents shifting of the dye barrier and desiccant, a substantial portion of the desiccant material is not coated with the dye and thereby these uncoated particles may be removed from the cartridge and satisfactory LOI testing conducted thereon.

A preferred embodiment of the desiccant cartridge consists of a cup extending along an axis and having spaced inner and outer wall portions connected by a transverse portion to define a chamber having an opening for the placement of a dye wafer and desiccant particles, and a cap consisting of a planar portion having an outer circumference and an inner circumference defining an aperture for receiving the inner wall portion when the cap is received in the chamber. The cap further is provided with a peripheral flanged portion extending transversely from the outer circumference of the planar portion. The peripheral flanged portion having spaced apart locking tabs each with an edge portion that is adapted to fit contiguously with the outer wall portion of the cartridge.

As such, it is one object of the invention to provide a desiccant cartridge which is simple to assemble, and allows for the user to compress the cap into the cup to sufficiently eliminate empty space within the chamber.

It is another object of the invention to prevent the shifting of the dye wafer and desiccant particles, thus, eliminating attrition of the desiccant and allowing satisfactory LOI testing to be conducted thereon.

This invention also eliminates the need for external springs or other devices that add more cost to the cartridge.

Lastly, since the cup-shaped cartridge is formed into a specific, definite shape and dimension depending on the particular canister in which it is to be housed, the air or refrigerant system is efficient, minimizing by-pass of the fluid flow from the desiccant particles which can in some cases occur.

The invention will be further described in conjunction with the appended drawings and following detailed description.

DETAILED DESCRIPTION OF THE PREFERRED EMBODIMENT

Figure 1:
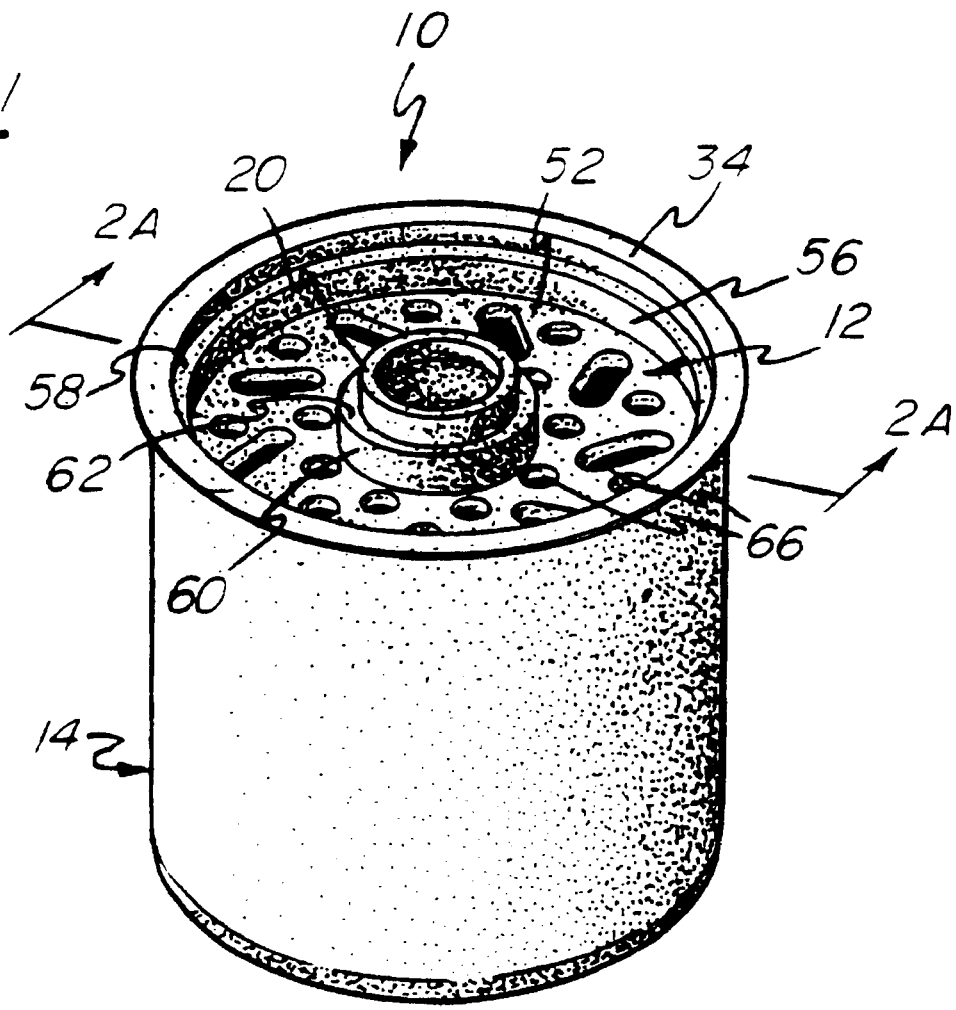
FIG. 1 is a front perspective view of one embodiment of a desiccant cartridge of the present invention.

FIGS. 1–14 illustrate a desiccant cartridge 10 which comprises a cap 12 and a generally cylindrically cross-sectioned cup 14 for holding desiccant particles 16 and a dye wafer 18.

Figure 2:
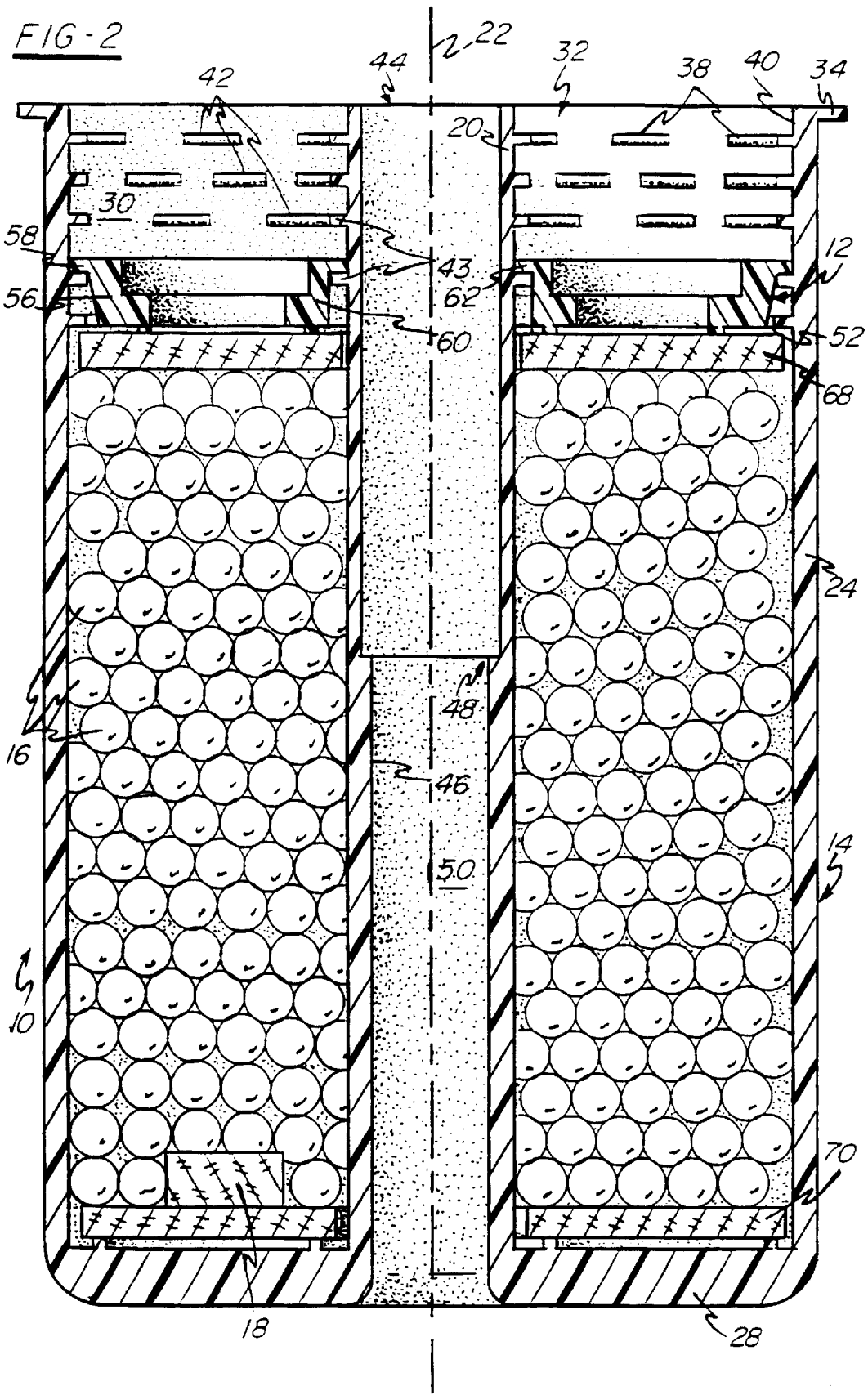
FIG. 2 is a cross-sectional view of the desiccant cartridge of FIG. 1 taken along the plane represented by lines and arrows 2A—2A in FIG. 1.
Figure 3:
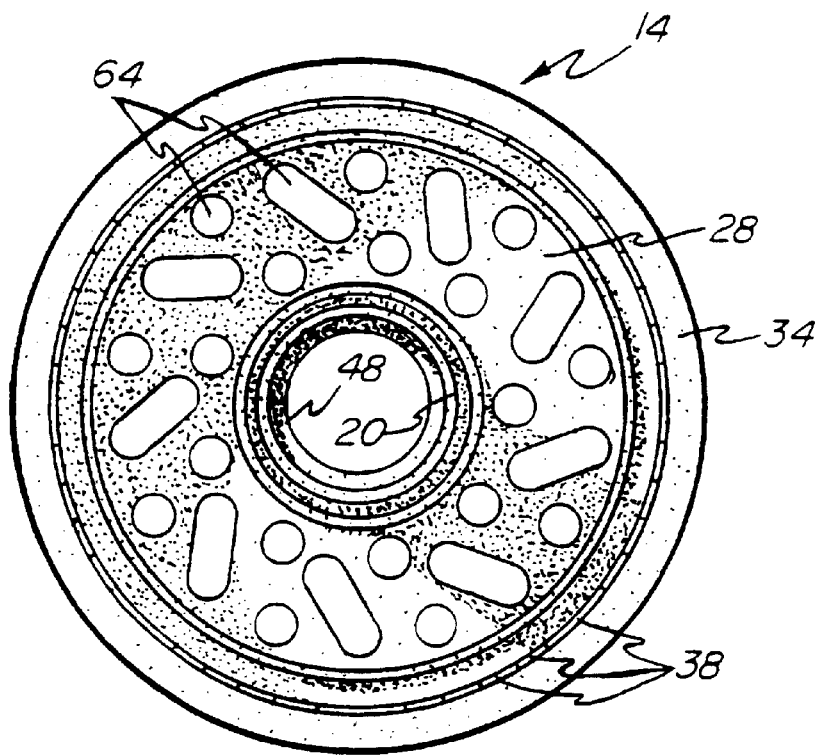
FIG. 3 is a top plan view of the desiccant cartridge of FIG. 1 without the cap installed.

As seen in FIG. 2, the cup 14 is a one-piece plastic molding which includes a cylindrical inner wall portion 20 extending along a central axis 22, a cylindrical outer wall portion 24 concentric with the inner wall portion 20, and a bottom defined by a transverse portion 28 which joins the inner wall portion 20 to the outer wall portion 24. The inner and outer wall portions 20,24 and the transverse portion 28 cooperate to define a chamber 30 having an opening 32 for receiving the desiccant 16 and dye wafer 18.

The outer wall portion 24 of the cup includes at least one outwardly flared lip portion 34. The flared lip portion 34 is adapted to resiliently fit within a dryer canister 36 (FIG. 7) of an air conditioning or refrigeration system (not shown).

Thus, the desiccant cartridge 10 is retained within the dryer canister 36 (FIG. 8) by means of a friction or interference fit provided by the flared lip portion 34. The lip portion 34 also serves as a continuous annular seal to prevent air or fluid escape that may otherwise occur along the interface between the circumference of the cup 14 and the dryer canister 36. Although the lip 34 is shown at the top of the cup, it can be located anywhere along the axial length dimension of the cup.

As best shown in FIG. 2, the cylindrical outer wall portion 24 of the cup 14 may include a plurality of circumferentially spaced-apart outer wall protrusions 38 such as ribs, ribs, beads, bumps or other equivalent protrusions projecting radially inwardly from an inner surface 40 of the outer wall portion 24. The protrusions 38 are arranged in axially-spaced outer wall protrusion groupings 42 and are oriented in a common plane which extends transverse to the central axis 22. As discussed further below, the protrusions 38 permit the cap 12 to be retained within the chamber 30 in one of several positions to reduce or prevent movement or shifting of the desiccant particles 16 and dye wafer 18 within the chamber 30. The artisan will appreciate that the inner wall portion 20 also may include a plurality of circumferentially spaced-apart inner wall protrusions (not shown) arranged in axially-spaced inner wall protrusion groupings 43 equivalent in form and function to the outer wall protrusions 38.

In FIG. 2, the inner wall portion 20 serves as a sleeve 44 for receiving a portion of an aluminum pipe or conduit 45 (FIG. 8) which communicates with an outlet port (not shown) of the air conditioning or refrigeration system. As shown, the inner wall portion 20 includes a stepped inner surface 46 which defines an intermediate shoulder or flange 48. Thus, the stepped inner surface 46 has two inner diameters $D_1$ and $D_2$, wherein $D_1 > D_2$. The inner diameter $D_1$ is substantially equal to or slightly larger than the outer diameter of the aluminum pipe or conduit 45. The aluminum pipe or conduit 45 (FIG. 8), when inserted into the inner wall portion 20, abuts against the shoulder 48 to urge the desiccant container 10 downwardly within the dryer canister 36.

The inner wall portion may also include an annular band or ring shaped flange reducing the inside diameter of the sleeve. This serves as an aid in locking or securing frictionally fitting the requisite accumulator or receiver-dryer tube therein.

Figure 8:
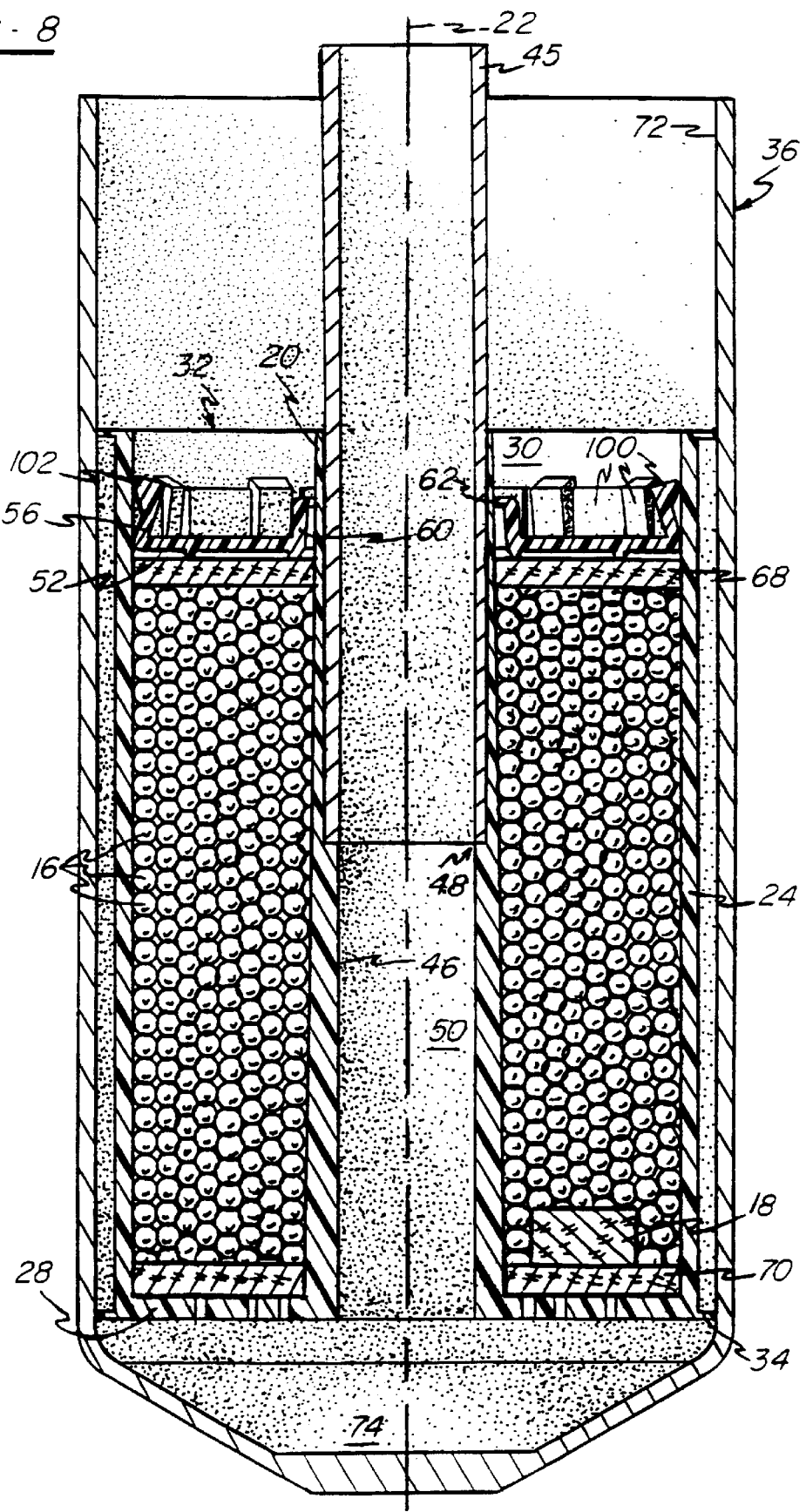
FIG. 8 is a cross-sectional view of the desiccant cartridge of FIG. 7 installed in a canister of an accumulator or receiver dryer.

As best shown in FIG. 8, the inner wall portion 20 and aluminum pipe or conduit 45 cooperate to define a continuous axially extending fluid passage 50.

As shown in FIG. 2, the dye is in the form of a wafer 18, but the artisan will appreciate that the dye may be present in a variety of physical forms such as a pellet, powder, permeable bag, capsule, etc. or the dye may simply be coated onto a few of the desiccant particles 16 themselves. Attention again is directed to U.S. Pat. No. 5,650,563 (Cooper et al.) and its disclosure of a variety of useful dyes and physical forms thereof that may be used to achieve the desired leak detection function.

Figure 4:
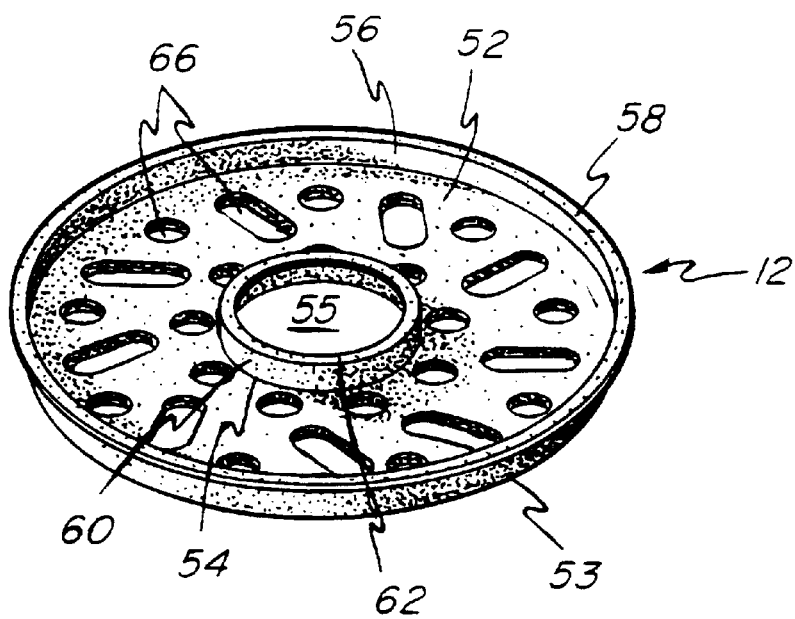
FIG. 4 is a top perspective view of the cap of FIG. 1.

As shown in FIGS. 1 and 4, the cap 12 conforms to the circular shape of the cup 14 and has a planar portion 52 having an outer circumference 53 and an inner circumference 54 defining an aperture 55 for receiving the inner wall portion 20 when the cap 12 is received in the chamber 30. The cap 12 further is provided with a peripheral flanged portion 56 extending transversely from the outer circumference 53 of the planar portion 52 and having a continuous edge portion 58 which cooperates with the outer wall portion 24 to retain the cap 12 to the cup 14.

Figure 5:
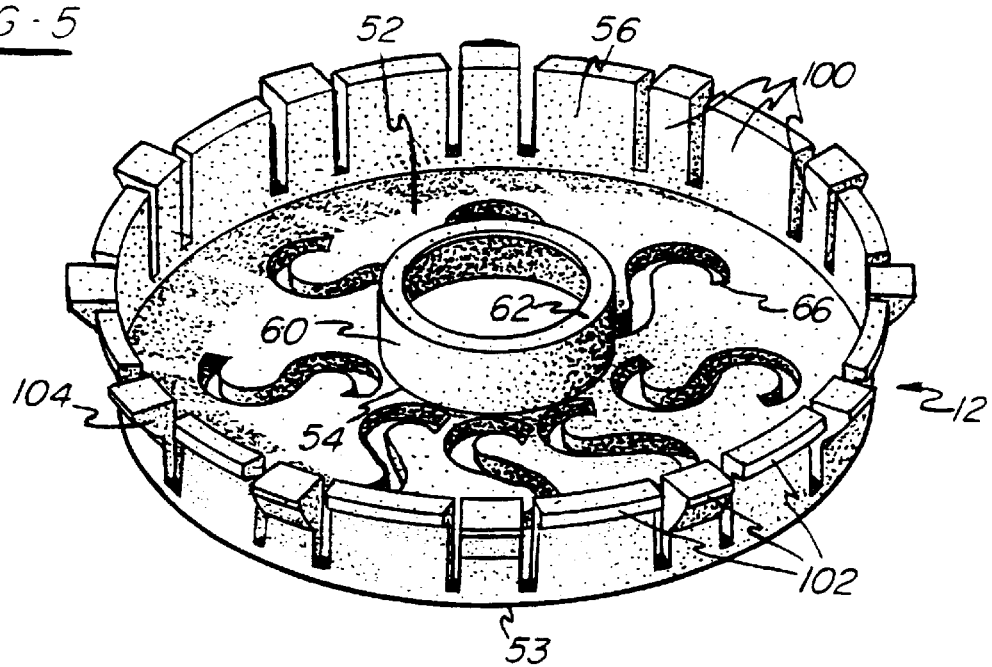
FIG. 5 is a top perspective view of another embodiment of a cap for a desiccant cartridge.
Figure 6:
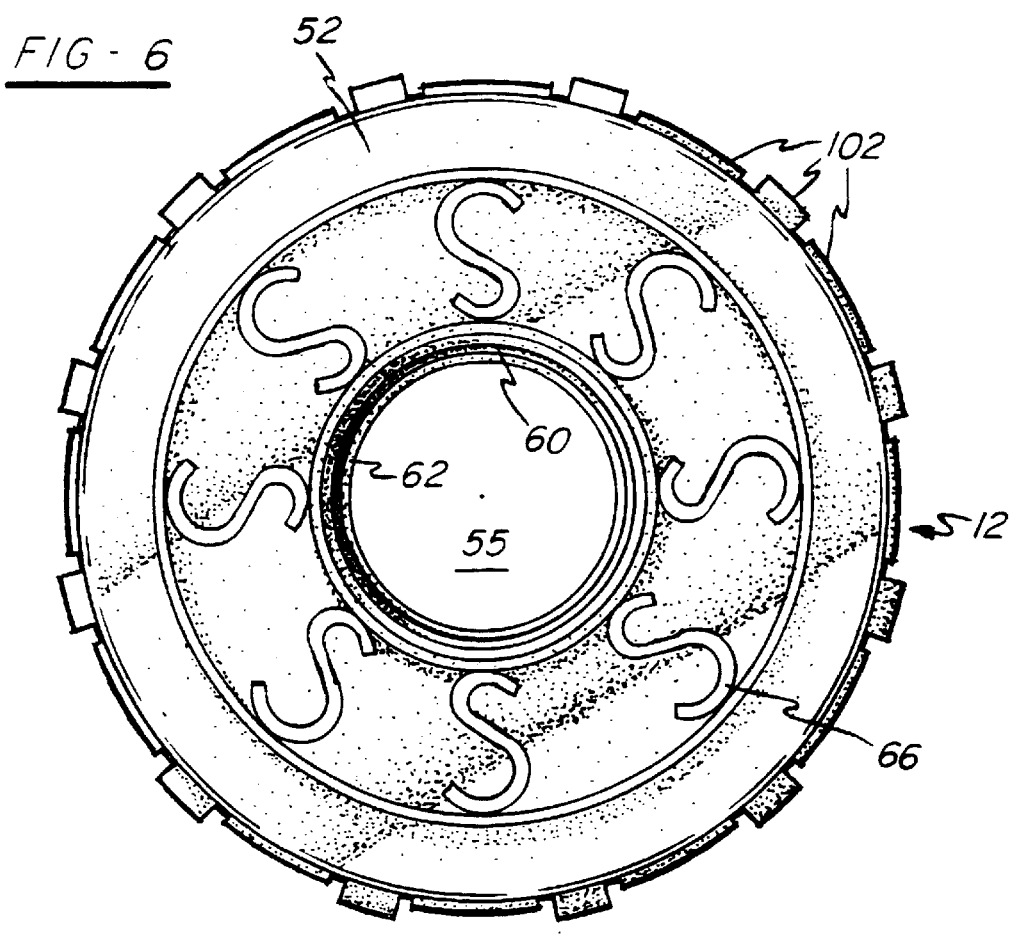
FIG. 6 is a bottom plan view of the cap of FIG. 5.
Figure 7:
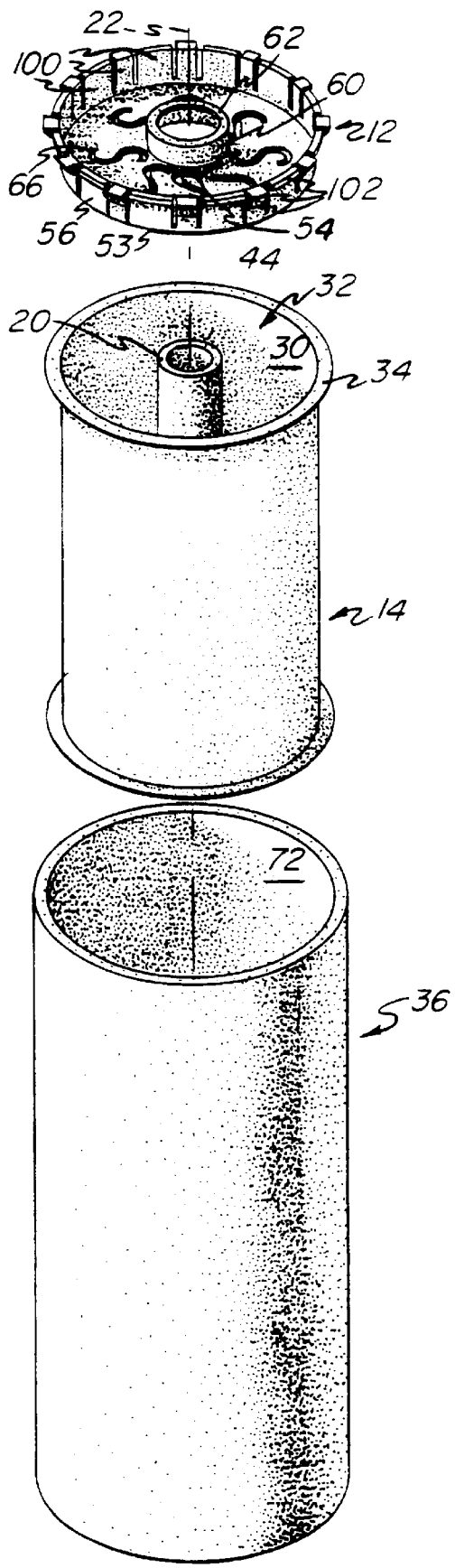
FIG. 7 is a top perspective exploded view assembly of a desiccant cartridge shown in combination with the cap of FIG. 5 and a canister of an accumulator or receiver dryer.

In another embodiment, as shown in FIGS. 5 and 6, the peripheral flanged portion 56 has a plurality of spaced-apart tabs 100 each with an edge portion 102 which cooperates with the outer wall portion 24 to positively lock the cap 12 to the cup 14 as shown in FIG. 8. That is, the outer diameter of the edge portion 102 is greater than the inner diameter of the outer wall portion 24. These tabs 100 are composed of a flexible plastic and, in effect, provide a spring like action as they are compressed for sliding, positioning or mounting along the container axis. Further, the edge portions 102 of any one tab 100 may vary in axial thickness 104 causing an edge portion 102 to extend substantially the entire length of the tab 100. As such, the greater the axial thickness 104 of the edge portion 102, the more surface area which cooperates with the outer wall portion 24 to provide a greater spring like action whereby the cap 12 can be retained more positively providing for better cap retention.

Figure 9:
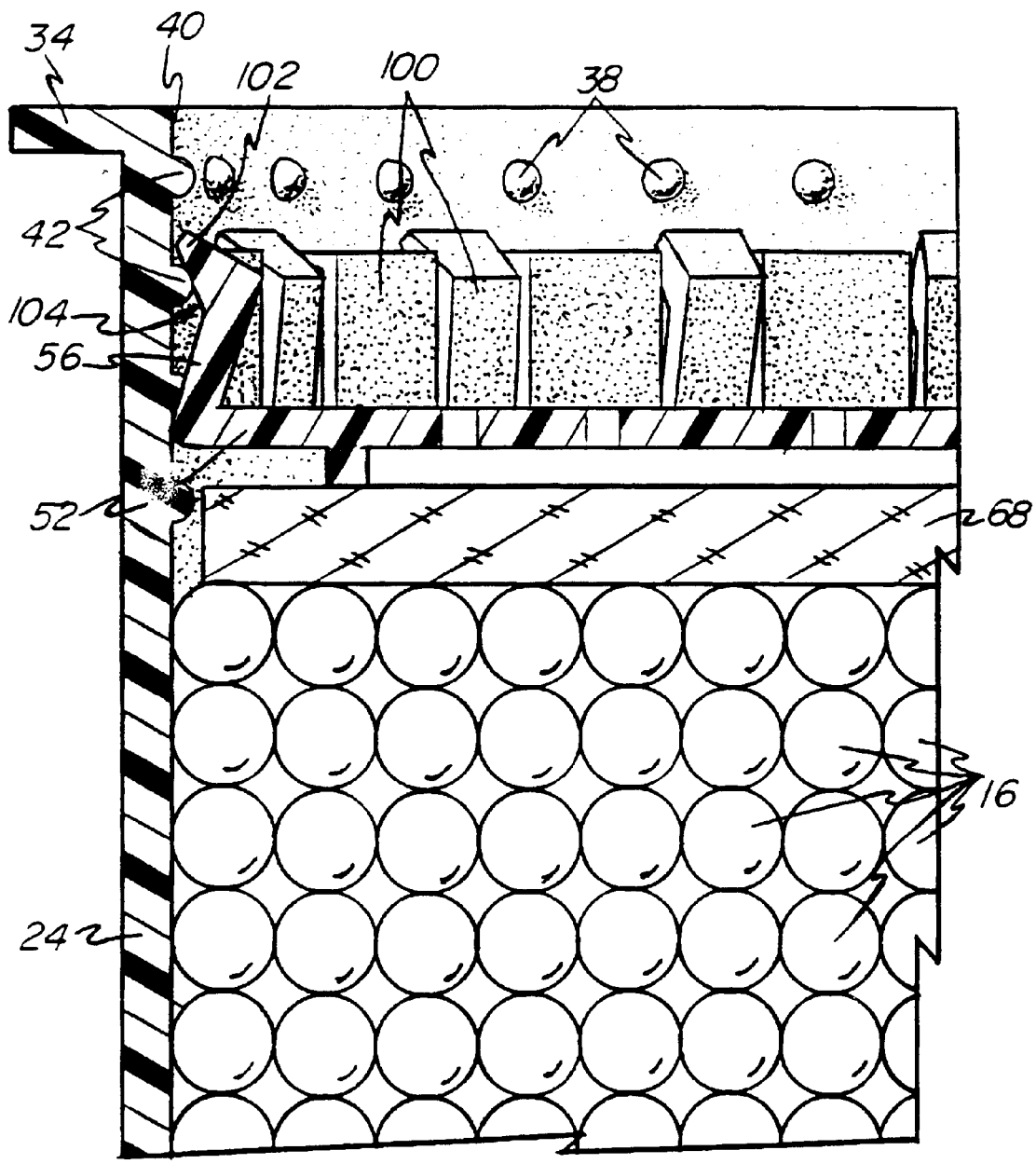
FIG. 9 is an enlarged partial cross-sectional view of the cap of FIG. 5 being retained in another embodiment of the cartridge of FIG. 7 having inwardly facing outer wall protrusion groupings (bumps shown here)

As shown in FIG. 9, if the cylindrical outer wall portion is provided with a plurality of circumferentially spaced-apart outer wall protrusions 38, the edge portion 102 of the tabs 100 simply pass over the outer wall protrusion groupings 42 when sufficient force is applied to the cap 12. Depending upon the position of the cap 12 in the chamber 30 and upon the axial thickness 104 of an edge portion 102, an edge portion 102 may be lockingly retained between axially adjacent outer wall protrusion groupings 42, or an edge portion 102 may abut against an outer wall protrusion grouping 42, thereby retaining the cap 12 in one of many axially-spaced positions to prevent shifting of the dye wafer 18 and desiccant particles 16. The cooperation of and the positioning of the portions 102 relative to the protrusions 42 operate to provide a downwardly (with respect to the figure) and axially directed compressive force on the lining 68 and desiccant material 16.

As shown in FIGS. 4 and 5, the artisan will appreciate that the cap 12 can be even further provided with a similar central flanged portion 60 extending transversely from an inner circumference 54 of the planar portion 52 with the central flanged portion 60 having one continuous edge portion 62, or spaced-apart tabs each with an edge portion (not shown), which cooperates with the inner wall portion 20, or inner wall protrusions 43, to help facilitate cap retention and to help prevent shifting of the dye wafer 18 and desiccant particles 16.

In FIGS. 3–6, the transverse portion 28 of the cup 14 and the planar portion 52 of the cap 12 are each perforated with a number of symmetrically arranged ports or perforations (64 and 66 respectively) so that the planar portion 52 and the transverse portion 28 are each permeable to the air or fluid to be dried. In the embodiment shown in FIG. 5, the ports 66 of the cap are arranged in one concentric annular row such that the row has eight s-shaped ports. The precise arrangement and shapes of the ports 64, 66 is not critical to the operation of the desiccant cartridge 10 as long as the desiccant 16 remains contained and air or fluid (not shown) is allowed to enter the cartridge 10, interact evenly with the desiccant 16, and exit from the cartridge 10.

As shown in the embodiments of FIGS. 2 and 8, plies of a permeable lining material 68, 70 such as felted polyester or gauze can be placed inside the chamber 30 near the transverse portion 28 and the cap 12 to trap the desiccant 16 in the cartridge 10. The lining material 68, 70 must be permeable to the air or fluid (not shown) to be dried but impermeable to the particulate desiccant 16. If gauze is used, the mesh size of the gauze must be significantly smaller than the grain size of the desiccant 16.

When the desiccant cartridge 10 is charged with the particulate desiccant 16, the first ply of the permeable lining material 70 can be inserted by sliding it down the inner wall portion 20 until positioned adjacent the transverse web portion 28. The dye wafer 18 is first placed into the chamber 30, and next the required amount of desiccant 16 is poured therein. Once the desiccant 16 is charged, the second ply of the permeable lining material 68 can be slid down the inner wall portion 20 against the desiccant 16.

The cap 12 is then inserted into the chamber 30 such that the inner wall portion 20 extends through the aperture 55 in the cap 12. As the cap 12 is urged downwardly toward the transverse portion 28, the edge portion 58, 102 passes radially inwardly and slides along the outer wall portion 24 until the planar portion 52 of the cap 12 abuts against the charged desiccant 16. As such, the cap 12 abuts against the second ply 68 while the edge portion 58, 102 thereof lockingly secures the dye wafer 18 in the mass of desiccant 16.

Once the desiccant cartridge 10 is assembled, it can then be inserted into a dryer canister 36 as shown in FIG. 8. The outwardly flared lip portion 34 resiliently bears against an inside surface 72 of the dryer canister 36 to provide a snug fit of the desiccant container 10 in the dryer canister 36. The lip portion 34 also serves to prevent air or fluid from bypassing the desiccant container 10 so as to ensure passage thereof through the chamber 30 and over the desiccant particles 16.

In the embodiment shown in FIG. 2 the aluminum pipe or conduit 45 is inserted into the inner wall portion 20 until the pipe 45 abuts against the shoulder 48. The desiccant container 10 is then urged downwardly into the canister 36 until it abuts against the closed end portion 74 of the canister 36.

The cup 14 may be vibrator or bowl fed to a robotic arm (not shown) for automatic installation into the dryer canister 36. The cup 14 may be sized to fit snugly in the canister 36 to inhibit bypass flow of air or fluid (not shown) to be dried. The means for detaining the cap 12 on the cup 14 is highly reliable such that dye contamination of the desiccant 16 from the dye wafer 18 is minimized. As a result, the non-contaminated desiccant particles can be accessed for reliable LOI testing.

Figure 10:
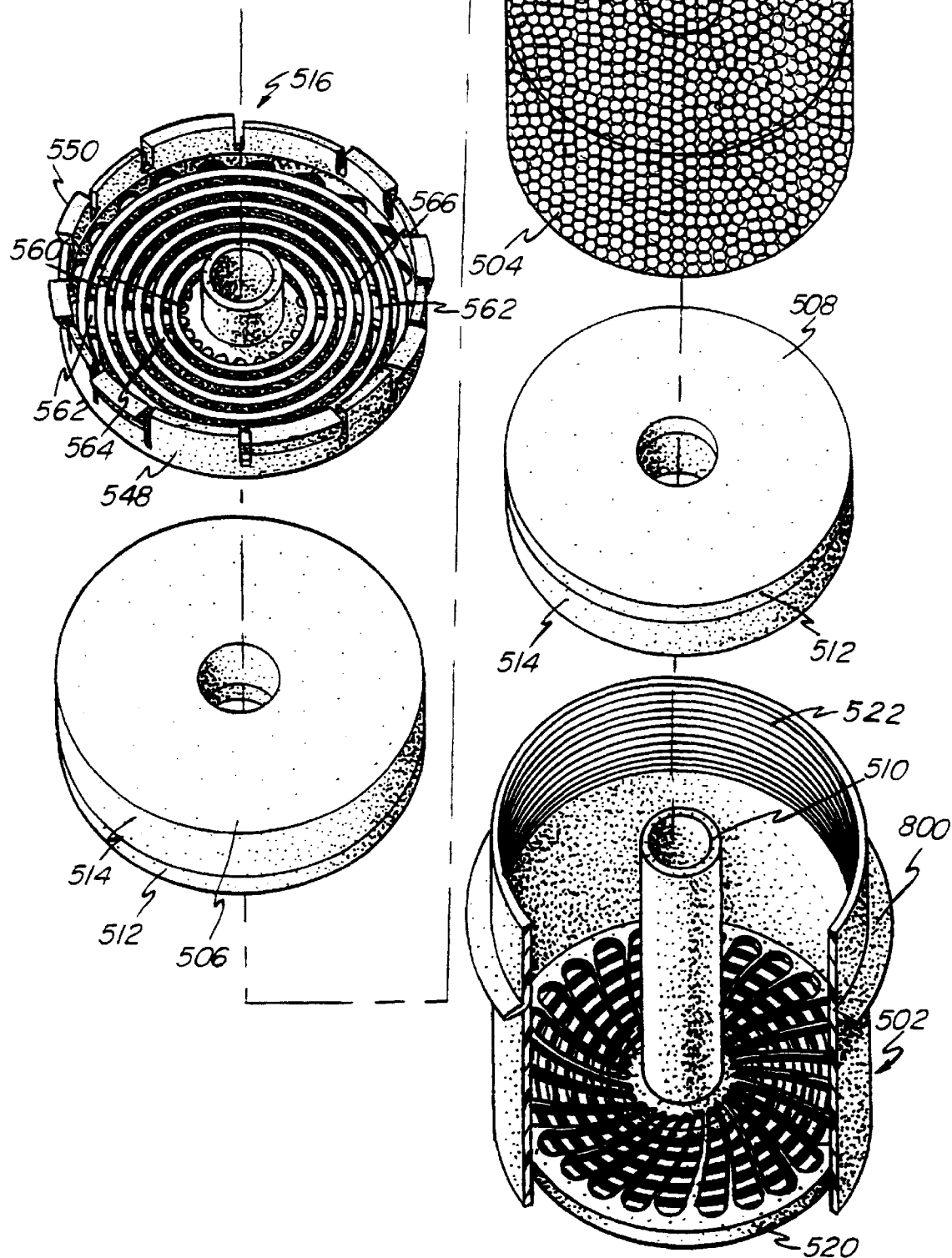
FIG. 10 is an exploded perspective view of the preferred cartridge and cap in accordance with the invention.
Figure 11:
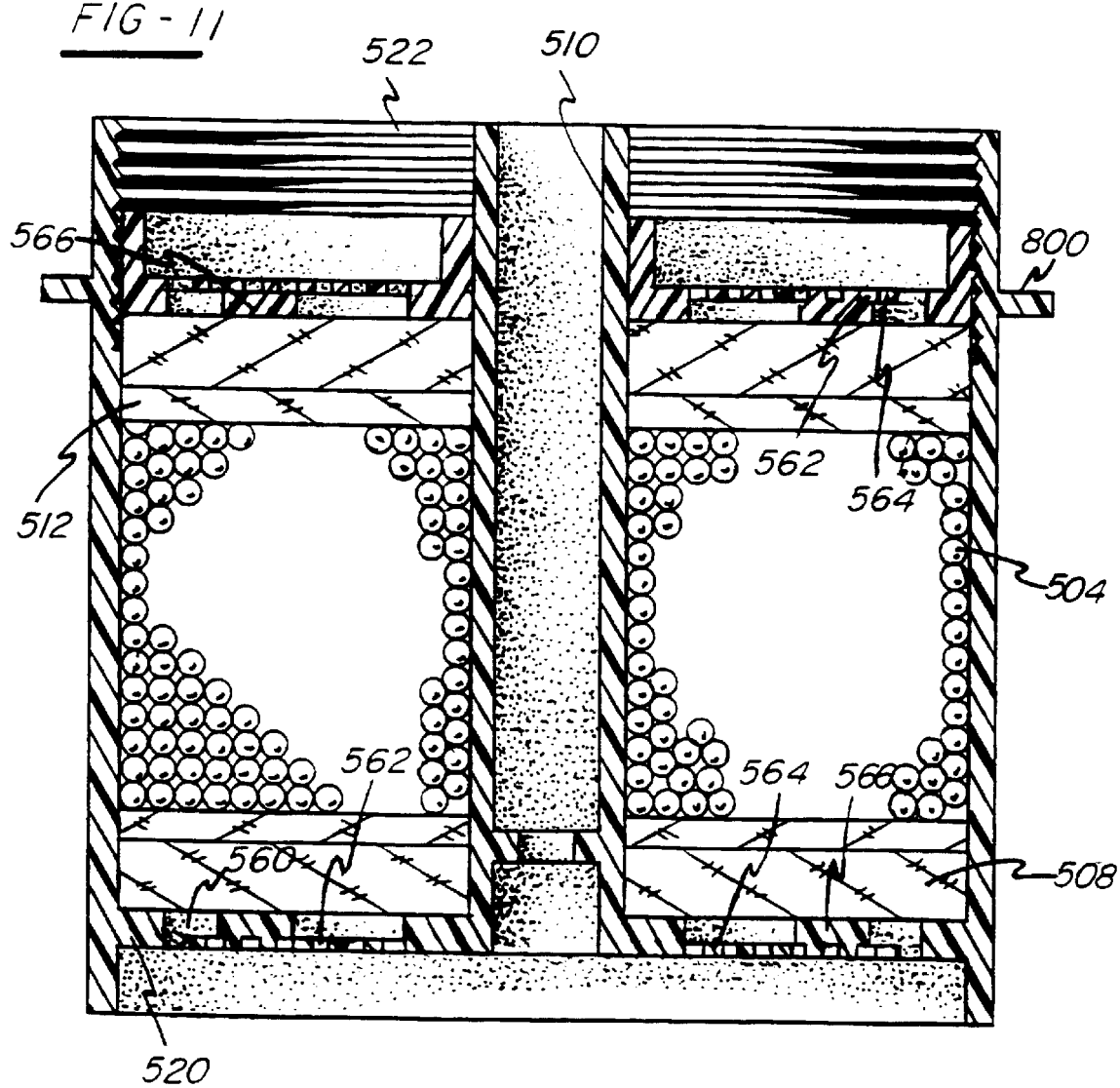
FIG. 11 is a cross sectional view taken along a plane dissecting the axis of the cartridge and cup combination shown in FIG. 10.

Tuning now to the preferred embodiment shown in FIGS. 10–14, and with specific attention to FIGS. 10 and 11, cup 502 is composed preferably of polypropylene, although polyester may also be mentioned as another polymer that may be used. Desiccant material 504 is interposed between dual density fiberglass laminates 506, 508 on the center axially disposed tube 510 of the cup.

The laminates 506, 508 are composed of a high density layer 512 and low density fiberglass batting layer 514 that have been laminated together via hot bonding or other bonding techniques. These laminates are available from Johns Manville under the Tuff Skin designation.

The desiccant material 504 comprises beads that are commercially available from Universal Oil Products under the XH7 designation.

The lid 516 composes a plurality of lock tabs 550. Bottom 520 of the cup comprises a multiplicity of openings therein that roughly correspond in shape and size to those provided in the lid.

The lid is snugly and adjustably mounted in the i.d. of the cartridge. The position of the lid along the axis of the cartridge may be varied. Accordingly, the lid may be snugly secured over a host of different desiccant volumes that may be provided in the cup.

The interior diameter of the cup or cartridge may be provided with an uneven, roughened surface texture 522 as shown by generally parallel ridges or grooves to increase the friction between the outer periphery of the lid and the cartridge walls. Bumps or other protrusions may be formed along the cartridge walls for this purpose.

As best shown in the FIG. 10 drawing, the circumferential wall or skirt 548 of the lid that is adapted to fit snugly with the inner wall of the cartridge is provided with a plurality of lock tabs 550 that are spaced from each other around the skirt. Each of the lock tabs protrudes radially outwardly from the skirt relative to the radial dimensions of the skirt. The tabs are composed of a flexible plastic and, in effect, provide a spring like action as they are compressed for sliding, positioning or mounting along the cartridge axis. The locking tabs cooperate with the textured inside surface of the cartridge to provide adjustable, friction mount of the lid along the axis of the cartridge.

An annular flange 800 is provided around the circumference of the cup and is composed of a flexible resilient plastic. The flange provides a snug fit within the surrounding canister or housing (not shown).

As shown, the cap is provided with a multiplicity of oblong, petal shaped apertures 560 (see FIG. 13) generally disposed with their major axes radially extending from the inner tube 510 toward the circumference of the cap. Superposed over the array of the petal shaped apertures are a plurality of concentric, annular openings 562 (see FIG. 12). The openings 562 are narrower than the width or minor axis of the openings 560.

The structure thus provides two levels of aperture depths. The first level is defined by the openings 562 and the solid concentric rings or ridges 564 that separate neighboring openings 562. The second level is defined by the generally oblong apertures 560 and the generally radially extending ridges 566 separating neighboring openings 560 from each other.

The surface area provided by the sum of the openings 560 is greater than the sum of the areas of the openings 562. This allows for the desired fluid flow volume through the cap, while the relatively narrow openings between the ridges 564 still serve to retain desiccant beads in the cup enclosure.

Similarly, the bottom 520 of the cup is also provided with this bi-level arrangement of openings wherein the relatively large petal shaped openings 560 are provided adjacent the fiberglass filter laminate 508 and with the annular openings provided under the array of openings 560 on the bottom side of the cup. Once again, the large surface area provided by the openings 560 will permit the desired volumetric flow of fluid through the cup with the narrower openings 562 serving as a retention cage to minimize desiccant loss through the bottom of the cup.

Figure 12:
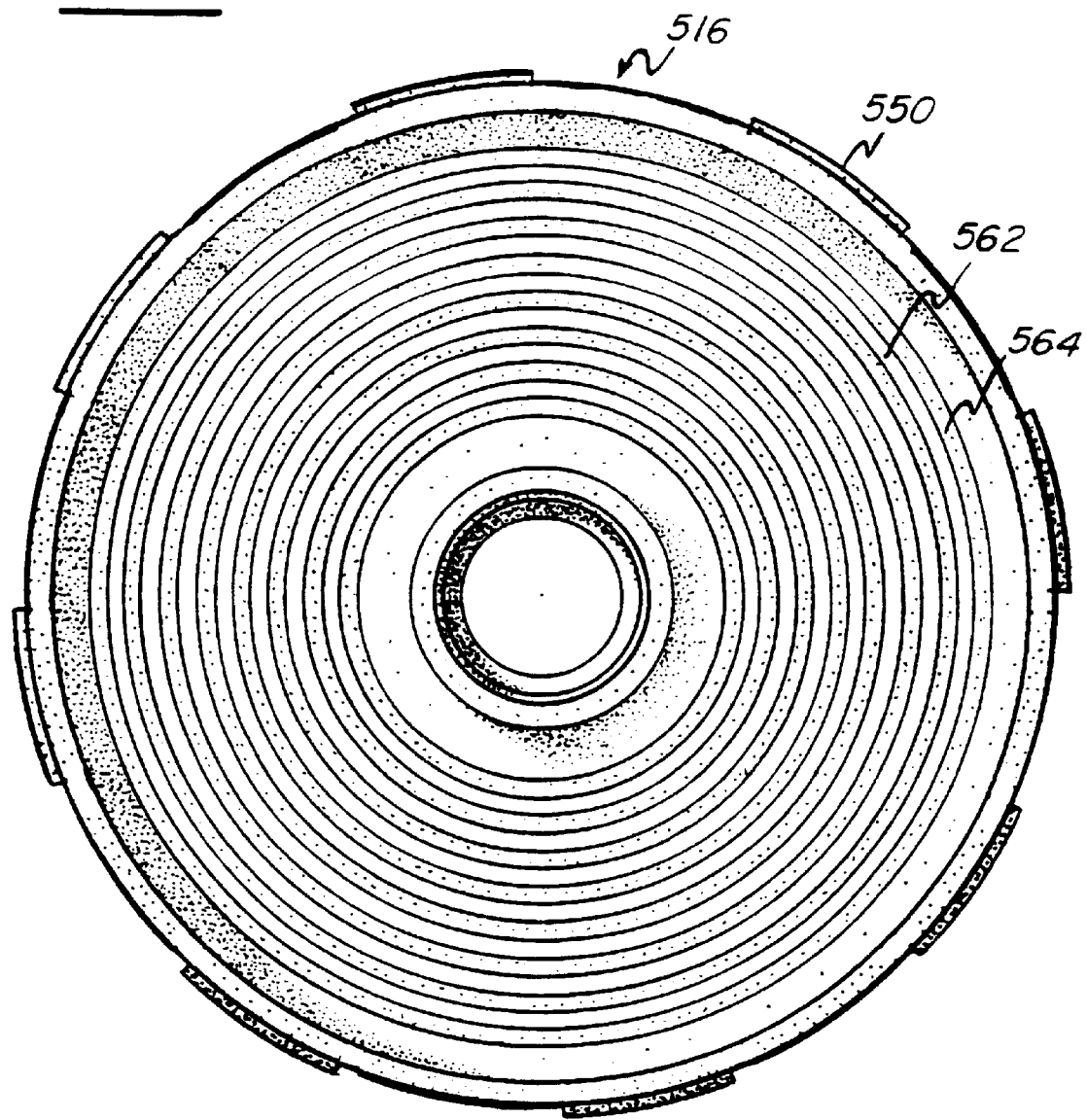
FIG. 12 is a schematic top view of the cap shown in the combination shown in FIG. 10, showing the top side array of annular openings therein.

With specific reference drawn to FIG. 12 the annular array of openings that are provided on the top of the cap and bottom of the cup are shown. Here, the openings 562 are presented in the form of concentric rings adapted for coaxial alignment with the inner tube 510. Each of the ring shaped openings is separated from its neighboring opening by a ring 564.

Figure 13:
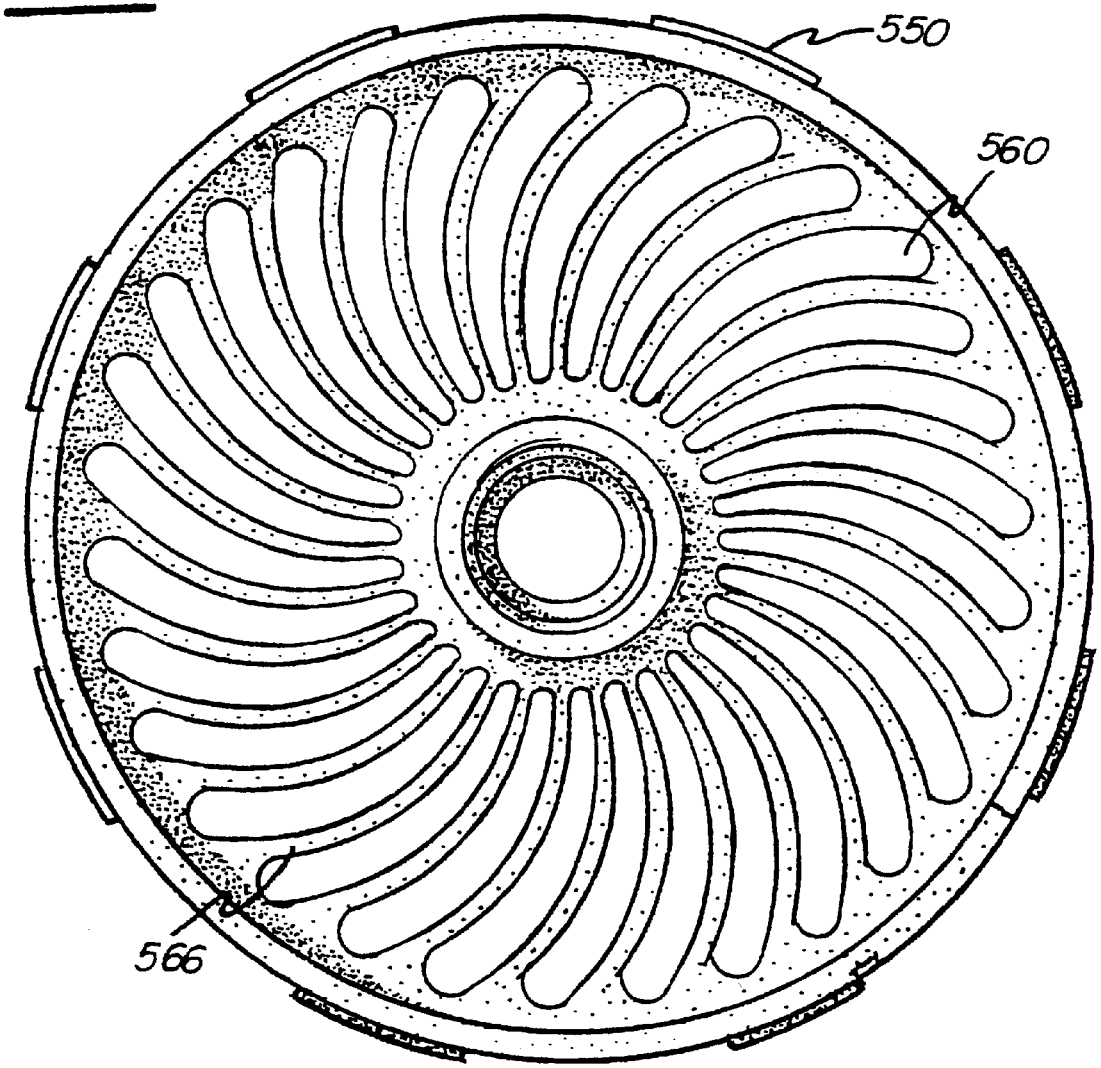
FIG. 13 is a schematic illustration of the bottom side view of the cap shown in the combination of FIG. 10, here detailing the bottom side array of petal or kidney shaped openings that will be placed adjacent the filter medium.

In FIG. 13, the petal shaped arrangement of openings adapted for placement adjacent the filter media is shown. Here petals or kidneys 560 are generally oblong and radially disposed about the axis represented by the inner tube 510.

Figure 14:
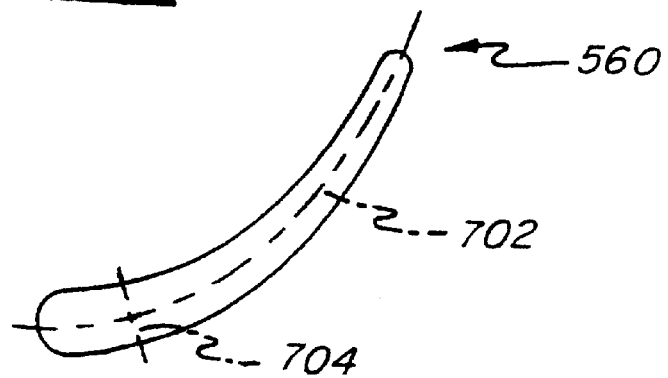
FIG. 14 is a magnified view of one of the petal or kidney shaped openings shown in FIG. 13.

The petals 560 have a major axis 702 extending generally radially and a minor axis 704 transverse to the major axis (FIG. 14). Individual petals or openings 560 are separated from neighboring openings in the array by generally extending ridge members 566.

The depth dimension (or axial dimension) of the ridge members 566 is greater than the depth dimension (axial dimension) of the rings 564.

The bead cage or bi-level arrangement of openings in the cap and cartridge bottom creates a large exposed area against the filter media, thus increasing efficiency and reducing pressure drop, and it also creates a reduced area small enough that a bead could not pass through. This reduced area section is not against the filter media and therefore does not reduce its efficiency.

The thickness of the filter retainer is used to create a transition between the larger open area against the filter media and the reduced area that is not against the filter media. The smaller openings do not allow the small beads to pass through, but at the same time, since they are not reducing filter surface area, they do not cause a reduction in filter efficiency and pressure drop.

Various changes or modifications in the invention described may occur to those skilled in the art without departing from the true spirit or scope of the invention. The above description of preferred embodiments of the invention is intended to be illustrative and not limiting, and it is not intended that the invention be restricted thereto but that it be limited only by the true spirit and scope of the appended claims.

What is claimed is:

1. A desiccant cartridge comprising:
   a cup having a spaced inner and outer wall portion connected by a transverse portion to define a chamber having an opening;
   a dye wafer contained within said chamber;
   a plurality of desiccant particles contained within said chamber and about said dye wafer; and
   a cap having an aperture for slidably receiving said inner wall portion such that said cap cooperates with said outer wall portion to provide adjustable, friction mount of the cap in said cup to prevent shifting of said dye wafer and said desiccant particles thereby leaving a substantial portion of said desiccant uncontaminated and useful for LOI testing, wherein said cap further comprises a planar portion having an inner circumference defining said aperture and an outer circumference, a peripheral flanged portion extending transversely from said outer circumference of said planar portion and said peripheral flanged portion is comprised of a plurality of spaced-apart tabs, each of said tabs having an edge portion such that said edge portion cooperates with said outer wall portion to provide adjustable, friction mount of said cap in said cup.

2. The desiccant cartridge of claim 1, wherein said edge portion has an axial thickness extending substantially the entire length of at least one of said tabs.

3. The desiccant cartridge of claim 1, wherein said tabs are composed of a flexible plastic.

4. The desiccant cartridge of claim 1, wherein said outer wall portion is provided with a plurality of outer wall protrusions projecting radially inwardly therefrom such that said outer wall protrusions cooperate with said cap.

5. The desiccant cartridge of claim 4, wherein said outer wall protrusions are arranged in axially-spaced circumferential outer wall groupings such that said cap can be lockingly retained in one of a plurality of axially-spaced positions.

6. The desiccant cartridge of claim 1, wherein said outer wall portion includes a flared lip extending outwardly therefrom.

7. The desiccant cartridge of claim 1 including first and second plies of permeable lining material for placement in said chamber to trap said dye wafer and said desiccant particles.

8. The desiccant cartridge of claim 1, including first and second plies of permeable lining material for placement in said chamber trapping said dye wafer and said desiccant particles in said chamber.

9. The desiccant cartridge of claim 1, wherein said transverse portion and said cap include perforations therein.

10. A desiccant cartridge comprising:
    a cup having a spaced inner and outer wall portion connected by a transverse portion to define a chamber having an opening;
    a plurality of desiccant particles contained within said chamber;
    a cap comprising a planar portion having an outer circumference and an inner circumference defining an aperture for slidably receiving said inner wall portion, said cap further comprising a peripheral flanged portion extending transversely from said outer circumference of said planar portion, said peripheral flanged portion provided with a plurality of spaced-apart tabs, each of said tabs having an edge portion whereby said edge portion cooperates with said outer wall portion to provide adjustable, friction mount of the cap in said cup after said cap is slid over said inner wall portion to prevent shifting of said desiccant particles.

11. The desiccant cartridge of claim 10, wherein said outer wall portion is provided with a plurality of outer wall protrusions projecting radially inwardly therefrom such that said outer wall protrusions cooperate with said edge portion of said tabs.

12. The desiccant cartridge of claim 11, wherein said outer wall protrusions are arranged in axially-spaced circumferential outer wall groupings such that said tabs can be lockingly retained in one of a plurality of axially-spaced positions.

13. The desiccant cartridge of claim 10, wherein said edge portion has an axial thickness extending substantially the entire length of at least one of said tabs.

14. The desiccant cartridge of claim 10, wherein said tabs are composed of a flexible plastic.

15. The desiccant cartridge of claim 10 including first and second plies of permeable lining material for placement in said chamber to trap the desiccant particles.

16. The desiccant cartridge of claim 10, wherein said transverse portion and said cap include perforations therein.

17. A desiccant cartridge comprising:
    a cup having a spaced inner and outer wall portion connected by a transverse portion to define a chamber having an opening, said outer wall portion provided with a plurality of outer wall protrusions projecting radially inwardly therefrom;
    a dye wafer contained within said chamber;
    a plurality of desiccant particles contained within said chamber about said dye wafer;
    a cap comprising a planar portion having an outer circumference and an inner circumference defining an aperture for slidably receiving said inner wall portion, said cap further comprising a peripheral flanged portion extending transversely from said outer circumference of said planar portion, said peripheral flanged portion provided with a plurality of spaced-apart tabs, each of said tabs having an edge portion such that said edge portion cooperates with said outer wall protrusions of said outer wall portion to provide adjustable, friction mount of the cap in said cup after said cap is slid over said inner wall portion thereby preventing shifting of said dye wafer and said desiccant particles within said chamber and leaving a substantial portion of said desiccant uncontaminated and useful for LOI testing.

18. The desiccant cartridge of claim 17, wherein said outer wall protrusions are arranged in axially-spaced circumferential outer wall groupings such that said tabs can be lockingly retained in one of a plurality of axially-spaced positions.

19. The desiccant cartridge of claim 17, wherein said tabs are composed of a flexible plastic.

20. The desiccant cartridge of claim 17, including first and second plies of permeable lining material for placement in said chamber to trap said dye wafer and said desiccant particles.

21. The desiccant cartridge of claim 17, wherein said transverse portion and said cap include perforations therein.

22. A desiccant cartridge comprising:
   a cup having a spaced inner and outer wall portion connected by a transverse portion to define a chamber having an opening;
   dye means containing a dye and located in said chamber;
   desiccant material disposed in said chamber; and
   a cap having an aperture for slidably receiving said inner wall portion and cooperating with said outer wall to provide adjustable, friction mount of said cap in said cup thereby compressing said desiccant and dye means in said cup to inhibit shifting of said dye means within said chamber thereby leaving a substantial portion of said desiccant uncontaminated and useful for LOI testing.

23. A desiccant cartridge as recited in claim 22 wherein said dye means comprise a wafer.

24. A desiccant cartridge as recited in claim 22 wherein said dye means comprise a pellet.

25. A desiccant cartridge as recited in claim 22 wherein said dye means comprise powder.

26. A desiccant cartridge as recited in claim 22 wherein said dye means comprise a permeable bag.

27. A desiccant cartridge as recited in claim 22 wherein said dye means comprise a capsule.

28. A desiccant cartridge as recited in claim 22 wherein said dye means comprise a coating on some of said desiccant.

29. A method of making a desiccant cartridge comprising the the steps of:
   providing a one-piece cup member including spaced inner and outer wall portions connected by a transverse portion to define a chamber having an opening;
   placing a dye wafer within said chamber;
   placing a plurality of desiccant particles within said chamber about said dye wafer;
   providing a cap having an aperture for slidably receiving said inner wall portions, a planar portion having an inner circumference defining said aperture and an outer circumference, and a peripheral flanged portion extending transversely from said outer circumference of said planar portion; and
   sliding said cap over said inner wall portion such that said cap cooperates with said outer wall portion to provide adjustable, friction mount of the cap in said cup to prevent shifting of said dye wafer and said desiccant particles within said chamber thereby leaving a substantial portion of said desiccant uncontaminated and useful for LOI testing, wherein said peripheral flanged portion with a plurality of spaced-apart tabs, each of said tabs having an edge portion such that said edge portion cooperates with said outer wall portion to provide adjustable, friction mount of the cap in said cup.

30. A method of making the desiccant cartridge in claim 29 further comprising providing said edge portion with an axial thickness extending substantially the entire length of at least one of said tabs.

31. A method of making the desiccant cartridge in claim 29, wherein said tabs are composed of a flexible plastic.

32. A method of making the desiccant cartridge in claim 29 further comprising providing said outer wall portion with a plurality of outer wall protrusions projecting radially inwardly therefrom such that said outer wall protrusions cooperate with said cap.

33. A method of making the desiccant cartridge in claim 32, further comprising arranging said outer wall protrusions in axially-spaced circumferential outer wall groupings such that said cap can be lockingly retained in one of a plurality of axially-spaced positions.

34. A method of making the desiccant cartridge in claim 29 further comprising placing first and second plies of permeable lining material in said chamber to trap said dye wafer and said desiccant particles.

35. A method of making the desiccant cartridge in claim 29 further comprising providing said transverse portion and said cap with perforations therein.

36. A method for making a desiccant cartridge comprising the steps of:
   providing a one-piece cup including spaced inner and outer wall portions connected by a transverse portion to define a chamber having an opening;
   placing a plurality of desiccant particles within said chamber;
   providing a cap comprising a planar portion having an outer circumference and an inner circumference defining an aperture for slidably receiving said inner wall portion, said cap further comprising a peripheral flanged portion extending transversely from said outer circumference of said planar portion, said peripheral flanged portion provided with a plurality of spaced-apart tabs, each of said tabs having an edge portion; and
   sliding said cap over said inner wall portion such that said edge portion of said tabs cooperates with said outer wall portion to provide adjustable, friction mount of the cap in said cup to prevent shifting of said desiccant particles within said chamber.

37. A method of making the desiccant cartridge in claim 36 further comprising providing said edge portion with an axial thickness extending substantially the entire length of at least one of said tabs.

38. A method of making the desiccant cartridge in claim 36, wherein said tabs are composed of a flexible plastic.

39. A method of making the desiccant cartridge in claim 36 further comprising providing said outer wall portion with a plurality of outer wall protrusions projecting radially inwardly therefrom such that said outer wall protrusions cooperate with said edge portion of said tabs.

40. A method of making the desiccant cartridge in claim 39 further comprising arranging said outer wall protrusions in axially-spaced circumferential outer wall groupings such that said tabs can be lockingly retained in one of a plurality of axially-spaced positions.

41. A method of making the desiccant cartridge in claim 36 further comprising placing first and second plies of permeable lining material in said chamber to trap said desiccant particles.

42. A method of making the desiccant cartridge in claim 36 further comprising providing said transverse portion and said cap with perforations therein.

43. A method for making a desiccant cartridge comprising the steps of:

provi ding a one-piece cup including spaced inner and outer wall portions connected by a transverse portion to define a chamber having an opening, said outer wall provided with a plurality of outer wall protrusions projecting radially inwardly therefrom;

placing a dye wafer within said chamber;

placing a plurality of desiccant particles within said chamber about said dye wafer;

providing a cap comprising a planar portion having an outer circumference and an inner circumference defining an aperture for slidably receiving said inner wall portion, said cap further provided with a peripheral flanged portion extending transversely from said outer circumference of said planar portion, said peripheral flanged portion provided with a plurality of spaced-apart tabs, each of said tabs having an edge portion; and sliding said cap over said inner wall portion such that said edge portion of said tabs cooperates with said outer wall protrusions to provide adjustable, friction mount of the cap in said cup to prevent shifting of said dye wafer and said desiccant particles within said chamber thereby leaving a substantial portion of said desiccant uncontaminated and useful for LOI testing.

44. A method of making the desiccant cartridge in claim 43 further comprising arranging said outer wall protrusions in axially-spaced outer wall circumferential groupings such that said tabs can be lockingly retained in one of a plurality of axially-spaced positions.

45. A method of making the desiccant cartridge in claim 43, wherein said tabs are composed of a flexible plastic.

46. A method of making the desiccant cartridge in claim 43 further comprising placing first and second plies of permeable lining material in said chamber to trap the desiccant particles in said chamber.

47. A method of making the desiccant cartridge in claim 43 further comprising providing said transverse portion and said cap with perforations therein.

\* \* \* \* \*